United States Patent
Keyes et al.

(10) Patent No.: US 11,668,606 B2
(45) Date of Patent: Jun. 6, 2023

(54) ASPHALT MAT THERMAL PROFILE VERIFICATION METHOD AND SYSTEM

(71) Applicant: Caterpillar Paving Products Inc., Brooklyn Park, MN (US)

(72) Inventors: Joshua D. Keyes, Saint Michael, MN (US); Jacob J. McAlpine, Otsego, MN (US); Nicholas A. Oetken, Brooklyn Park, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 418 days.

(21) Appl. No.: 16/739,759

(22) Filed: Jan. 10, 2020

(65) Prior Publication Data

US 2021/0215543 A1 Jul. 15, 2021

(51) Int. Cl.
*E01C 19/48* (2006.01)
*G01J 5/10* (2006.01)
*B60R 1/00* (2022.01)
*G06V 20/56* (2022.01)
*G01S 19/42* (2010.01)
*G01J 5/00* (2022.01)
*G01J 5/48* (2022.01)

(52) U.S. Cl.
CPC .......... *G01J 5/10* (2013.01); *B60R 1/00* (2013.01); *E01C 19/48* (2013.01); *G06V 20/56* (2022.01); *B60R 2300/108* (2013.01); *E01C 2301/00* (2013.01); *G01J 5/485* (2022.01); *G01J 2005/0077* (2013.01); *G01S 19/42* (2013.01)

(58) Field of Classification Search
CPC ...... G01J 5/10; G01J 5/485; G01J 2005/0077; G01J 5/0066; G01J 5/0275; G01J 5/00; G01J 5/48; B60R 1/00; B60R 2300/108; E01C 19/48; E01C 2301/00; E01C 19/16; G06V 20/56; G01S 19/42
See application file for complete search history.

(56) References Cited

U.S. PATENT DOCUMENTS

| | | | |
|---|---|---|---|
| 6,749,364 B1 * | 6/2004 | Baker | E01C 19/288 404/118 |
| 8,099,218 B2 | 1/2012 | Glee et al. | |
| 10,371,655 B2 | 8/2019 | Voegele | |
| 10,473,637 B2 | 11/2019 | Schoenbach et al. | |
| 10,482,330 B2 * | 11/2019 | Buschmann | H04N 5/33 |
| 2009/0256077 A1 * | 10/2009 | Brady | G01J 5/0088 250/330 |

(Continued)

*Primary Examiner* — Eyob Hagos
(74) *Attorney, Agent, or Firm* — Bookoff McAndrews, PLLC

(57) ABSTRACT

A method and system of verifying asphalt mat temperature values and location data generated by a paving machine includes identifying a location and temperature value of a threshold thermal characteristic of thermal data generated by the paving machine, and displaying the paver-generated location and temperature value of the threshold thermal characteristic on a display of the paving machine. The method further includes determining a location and temperature value of the threshold thermal characteristic by one or more external systems, and comparing the externally-determined location and temperature value to the paver-generated location and temperature value.

17 Claims, 5 Drawing Sheets

(56) References Cited

U.S. PATENT DOCUMENTS

| | | | |
|---|---|---|---|
| 2014/0133906 A1* | 5/2014 | Frelich | E01C 19/48 404/75 |
| 2016/0042235 A1* | 2/2016 | Buschmann | E01C 23/01 348/148 |
| 2016/0060819 A1* | 3/2016 | Oetken | E01C 19/23 404/72 |
| 2016/0245785 A1* | 8/2016 | Marsolek | E01C 19/48 |
| 2017/0030036 A1 | 2/2017 | Buschmann et al. | |
| 2017/0205814 A1* | 7/2017 | Marsolek | G06F 3/04847 |
| 2019/0003134 A1 | 1/2019 | Andersson | |
| 2019/0078270 A1* | 3/2019 | Laugwitz | E01C 19/004 |
| 2019/0078275 A1 | 3/2019 | Shelstad et al. | |
| 2020/0025970 A1* | 1/2020 | Buschmann | B60Q 9/00 |

* cited by examiner

ASPHALT MAT THERMAL PROFILE VERIFICATION METHOD AND SYSTEM

TECHNICAL FIELD

The present disclosure relates generally thermal profiles of asphalt mats, and more particularly, to methods and systems for confirming the accuracy of a thermal profile of an asphalt mat.

BACKGROUND

When depositing an asphalt mat, for example by a paving machine, there is a desire to have thermal uniformity across the entire mat. Without such thermal uniformity, the asphalt mat will have areas of thermal segregation that can eventually lead to the formation of cracks and potholes in the mat. Based on this, governing bodies or other entities in charge of overseeing the quality of a deposited asphalt mat may require or incentivize high thermal quality mats. To address this, paving machines may include a thermal profiling system that maps the thermal quality of a deposited asphalt mat. However, confirming the accuracy of thermal profiling system may be difficult and time consuming. Further, such governing bodies or entities may require that the accuracy of thermal profile systems be within certain specifications with respect to the temperature and location data of the thermal profile.

U.S. Patent Application Publication 2019/0078275A1 discloses a system and method for controlling a quality of a paving material distributed by a paving machine along a paving area. The method includes using a thermal imaging camera to create a thermal profile of a portion of the paving area in which the paving material is distributed. The thermal profile includes a plurality of temperature values assigned to respective measurement points. The method further includes analyzing the thermal profile in order to detect segregation spots of the paving material. While the system of the '275 publication provides a thermal profile of the distributed paving material, the system does not describe steps for verifying the accuracy of the thermal profile.

The asphalt mat thermal profile verification method and system of the present disclosure may solve one or more of the problems set forth above and/or other problems in the art. The scope of the current disclosure, however, is defined by the attached claims, and not by the ability to solve any specific problem.

SUMMARY

In one aspect of the present disclosure, a paving machine includes a thermal recognition system of the paver machine that creates thermal data of an area behind the paver, a position determining system that identifies the location of the thermal data in location coordinates; and a display that displays the location and temperature of a threshold thermal characteristic of the thermal data.

In another aspect of the present disclosure, a method of verifying asphalt mat temperature values and location data generated by a paving machine includes identifying a location and temperature value of a threshold thermal characteristic of thermal data generated by the paving machine, and displaying the paver-generated location and temperature value of the threshold thermal characteristic on a display of the paving machine. The method further includes determining a location and temperature value of the threshold thermal characteristic by one or more external systems, and comparing the externally-determined location and temperature value to the paver-generated location and temperature value.

In yet another aspect of the present disclosure, a method of verifying asphalt mat temperature values and location data generated by a paving machine includes identifying a location and temperature value of a thermal object using a thermal recognition system and position determining system of the paving machine, and displaying the paver-generated location and temperature value of the thermal object on a display of the paving machine. The method further includes determining a location and temperature value of the thermal object by one or more external systems, and comparing the externally-determined location and temperature value to the paver-generated location and temperature value.

BRIEF DESCRIPTION OF THE DRAWINGS

The accompanying drawings, which are incorporated in and constitute a part of this specification, illustrate examples of the present disclosure and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," substantially," and "approximately" are used to indicate a possible variation of ±10% in the stated value.

Figure 1:
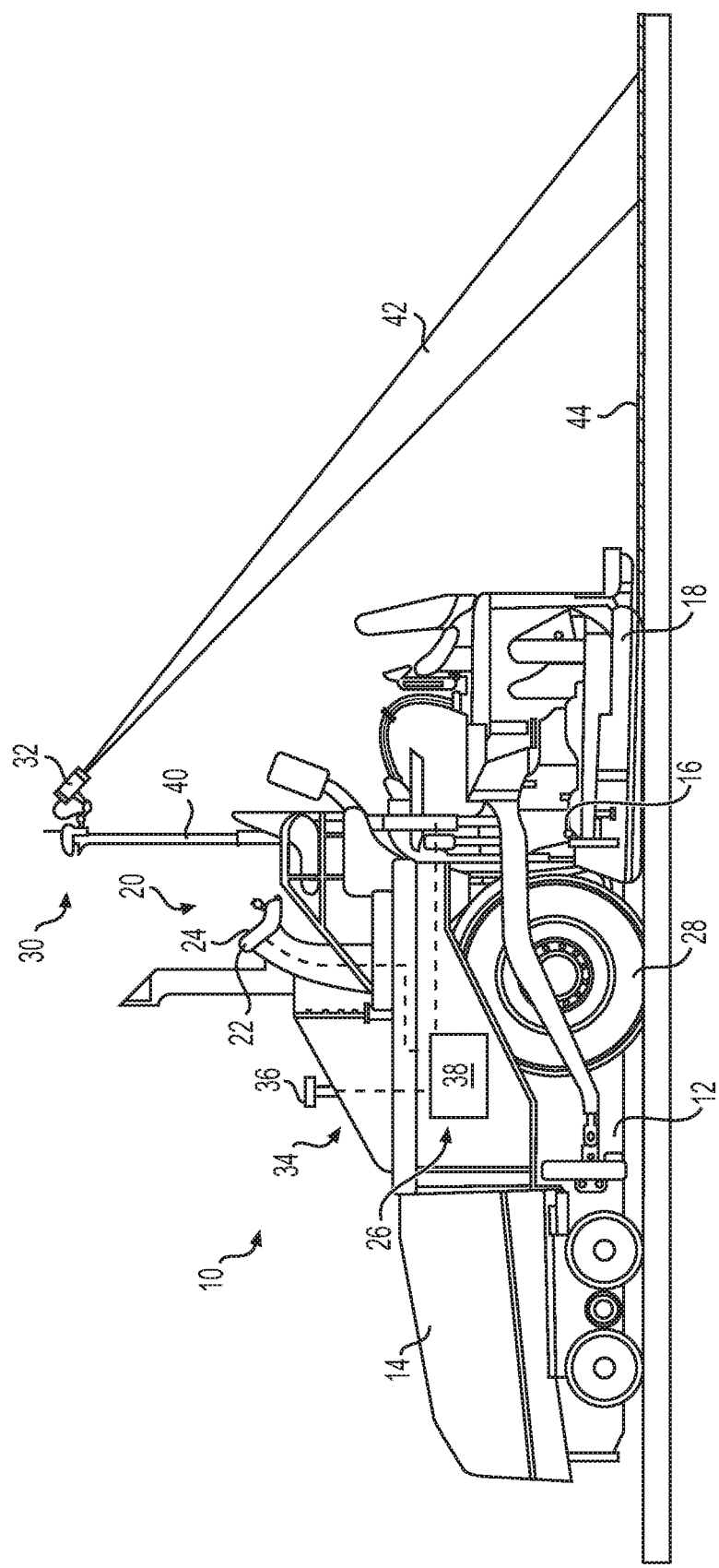
FIG. 1 shows a exemplary paving machine in accordance with the present disclosure.

FIG. 1 illustrates a side view of an exemplary paving machine 10, according to the present disclosure. Paving machine 10 may be of any conventional size and design, and may include a frame 12, a hopper 14, an auger 16, and a screed 18. Paving machine 10 may also include an operator station 20 from which an operator may maneuver and control paving machine 10. Operator station 20 may also include at least one control panel 22 including at least one operator display 24. Paving machine 10 may be propelled by an engine assembly 26 to power a drive assembly including one or more wheels 28 or tracks. Machine 10 includes a conveyor assembly to transport paving material from hopper 14 to auger 16 and screed 18.

Paving machine 10 may also includes a plurality of sensing and/or detecting elements. For example, machine 10 may include a thermal recognition system 30 including, for example, a thermal imaging camera 32; and may include a position determining system 34 including, for example, a global positioning system (GPS) having one or more GPS antennae 30. The thermal imaging camera 32 and GPS antenna 36 may be communicate with a controller 38 of paving machine 10. Further, controller 38 may be coupled to control panel 22 and operator display 24.

Figure 2:
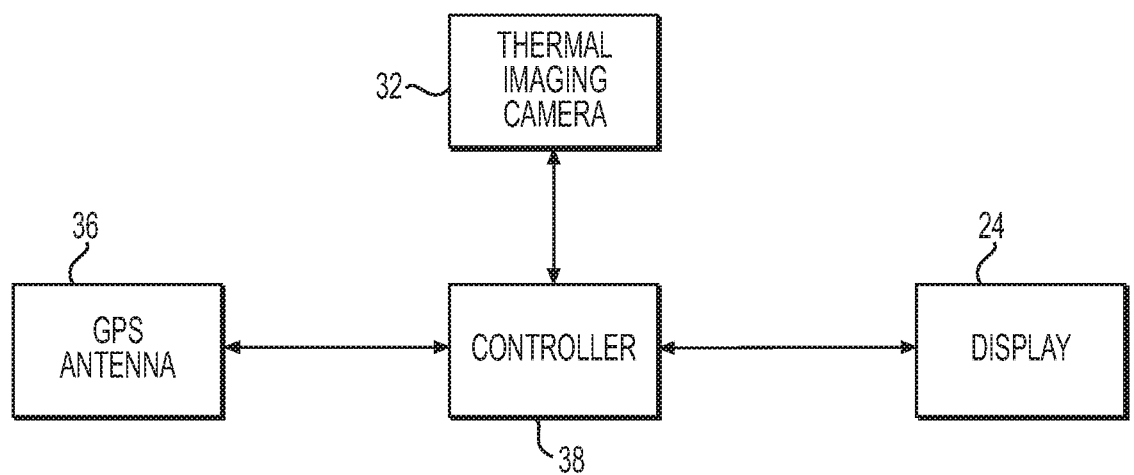
FIG. 2 shows an exemplary control system of the paving machine of FIG. 1.

Referring to FIGS. 1 and 2, the thermal imaging camera 32 of thermal recognition system 30 may be mounted above paving machine 10, for example on a vertical pole 40, and positioned so as to have a field of view 42 behind the paving machine 10 to view an area of the asphalt mat 44 recently deposited by the paving machine 10. While the thermal recognition system 30 will be described as including a thermal imaging camera 32, it is understood that any appropriate thermal sensing components may be used in thermal recognition system 30. Similarly, while the positioning determining system 34 is described herein as including a GPS system, it is understood that any appropriate positioning determining system may be implemented (e.g. Global Navigation Satellite System (GNSS), and trilateration/triangulation of cellular networks or Wi-Fi networks, etc.).

Figure 3:
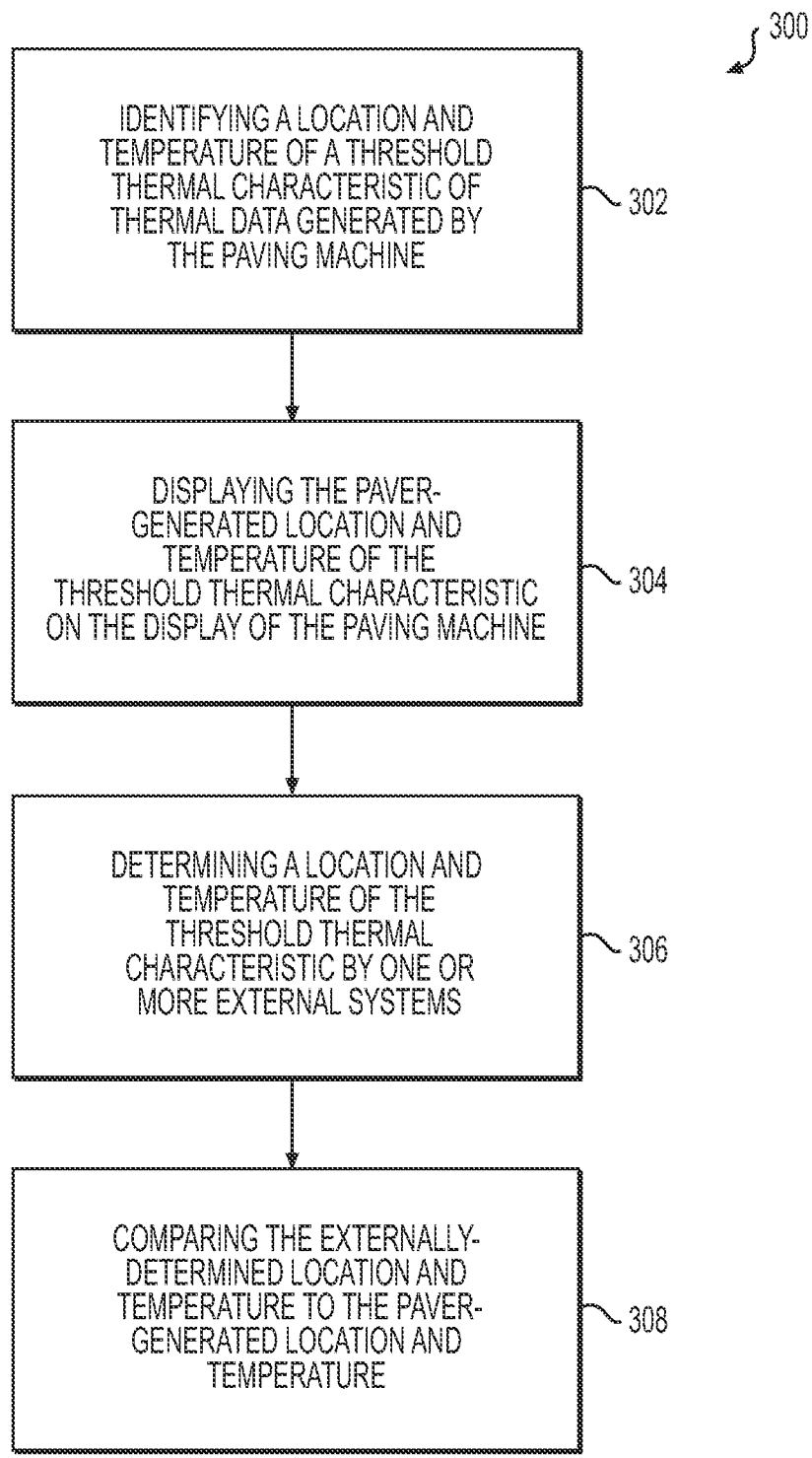
FIG. 3 provides is a method of verifying asphalt mat temperature values and location data generated by the paving machine of FIG. 1.

Controller 38 may include any appropriate hardware, software, firmware, etc. to carry out the methods described in this disclosure, including the method of FIG. 3. Controller 38 may include one or more processors, memory, communication systems, and/or other appropriate hardware. The processors may be, for example, a single or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. As discussed above and shown in FIG. 2, controller 38 may send/receive data between thermal imaging camera 32 (e.g. thermal data), GPS antenna 36, and display 24. Such communication of data may include any conventional wired and/or wireless communication systems such as Ethernet, Bluetooth, and/or wireless local area network (WLAN) type systems.

Controller 38 is configured to use both the thermal recognition system 30 and the position determining system 34 to generate a thermal profile of the new asphalt mat 44 deposited by paving machine 10. The thermal profile may provide temperature values across the asphalt mat 44, and locational coordinates of the temperature values across the asphalt mat 44, as is know in the art. The thermal profile may be output from controller 38 to any appropriate destination, remotely or on-board, such as to display 24 of paving machine 10. As noted above, the thermal profile of the asphalt mat 44 may be used to determine a thermal uniformity of the asphalt mat 44, which is an indication of the quality of the asphalt mat 44.

Controller 38 may also be configured to provide a verification of the accuracy of the thermal profile, as explained in connection with the method of FIG. 3. For example, controller 38 may provide a method 300 of verifying asphalt mat temperature values and location data generated by paving machine 10, including the steps of: identifying a location and temperature value of a threshold thermal characteristic of thermal data generated by the paving machine 10 (step 302); displaying the paver-generated location and temperature of the threshold thermal characteristic on the display 24 of the paving machine (step 304); determining a location and temperature of the threshold thermal characteristic of the asphalt mat by one or more external systems (step 306); and comparing the externally-determined location and temperature to the paver-generated location and temperature (308).

Figure 4:
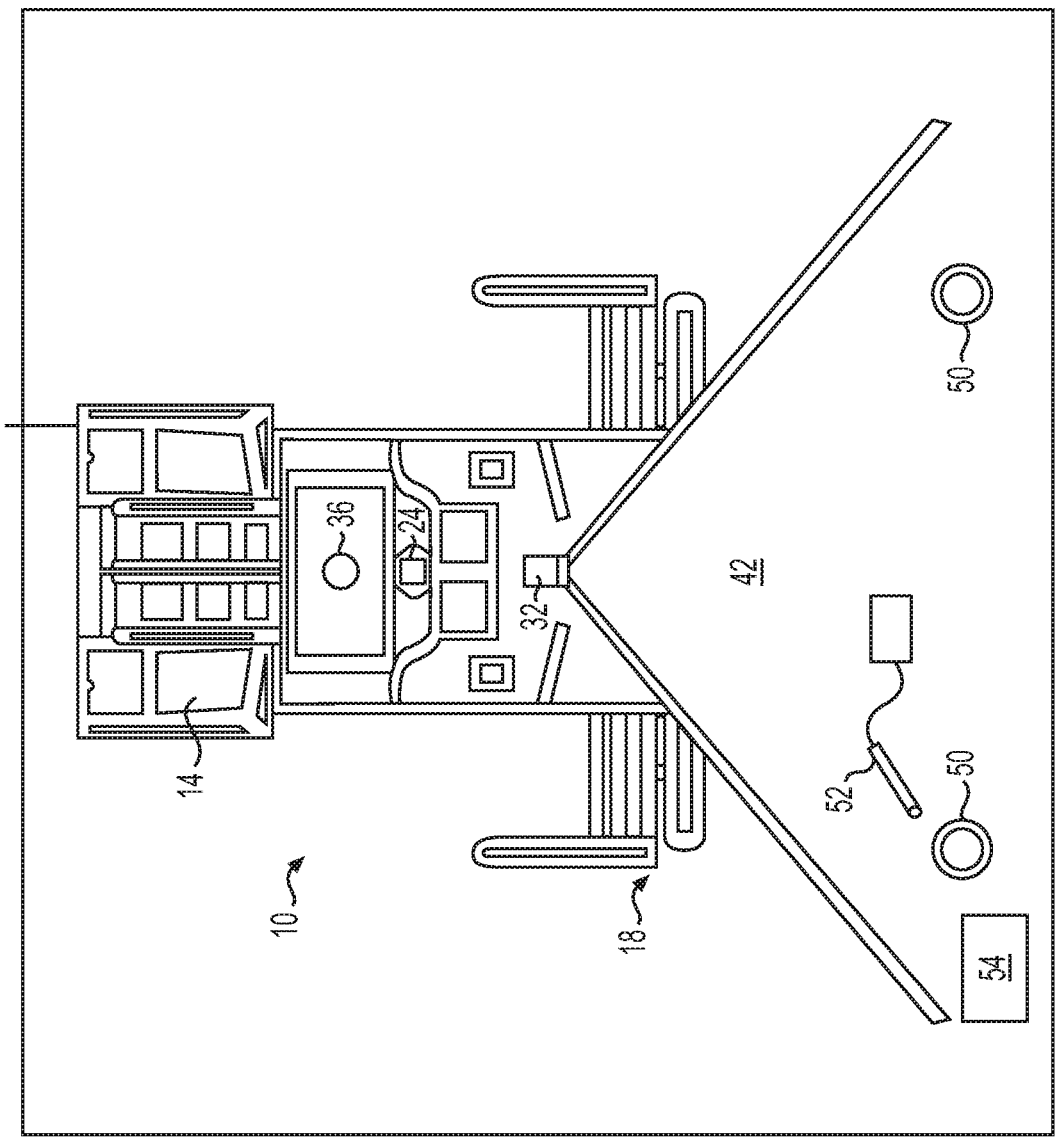
FIG. 4 shows a top view of the paving machine in accordance with the method of FIG. 3.

Regarding step 302 (identifying a location and temperature of a threshold thermal characteristic of thermal data generated by the paving machine 10), reference is made to FIG. 4 showing a top view of paving machine 10 where one or more thermal objects 50 have been placed in the field of view 42 of thermal camera 32 when the paving machine 10 is not performing a paving operation. The thermal object 50 may be a hot object, such as a Sterno™ type canned heat source, or a shovel of hot asphalt, or a cold object. The thermal object 50 should have a temperature that provides a noticeable temperature difference from the ground or asphalt on which the thermal object is placed. In one example, the thermal object 50 is placed on old or cooled asphalt. As used herein, a thermal object 50 includes any element or material that has a measureable temperature variation from a surrounding area on which it is located. Thus, the one or more thermal objects 50 provide for a threshold or identifiable thermal characteristic when compared to the surrounding environment. When analyzed by the thermal camera 32 and processed by controller 38, the thermal object 50 can be identified (e.g. by a comparison of adjacent thermal pixels of the thermal data having a delta temperature above a threshold value), and a temperature value of the object 50 can be registered. Controller 38 may be further configured to use the position determining system 34 to identify the location of the thermal object 50 (threshold thermal characteristic of the thermal data) in location coordinates.

Figure 5:
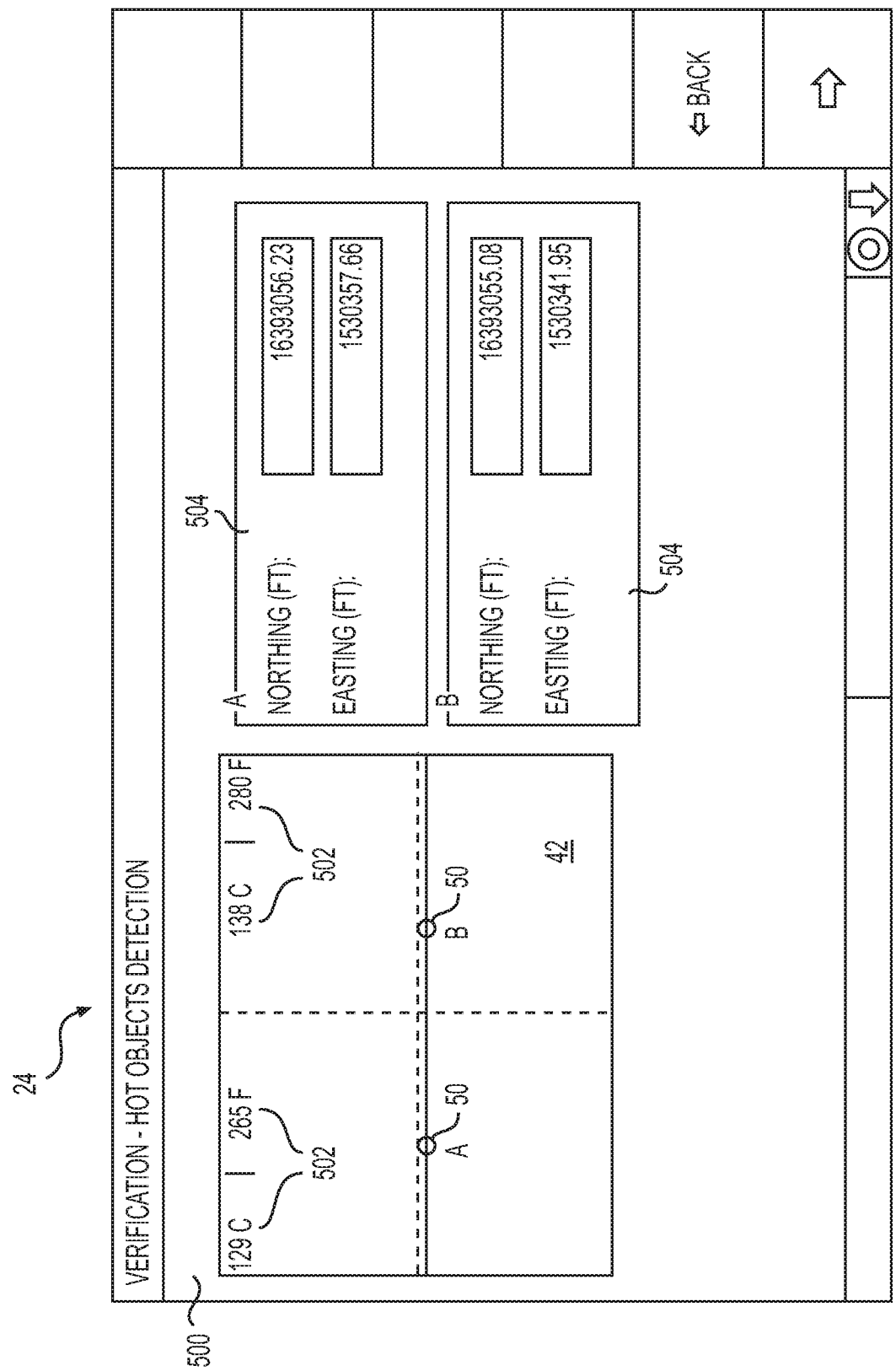
FIG. 5 shows an exemplary display screen/page of the paving machine of FIG. 1

Regarding step 304 of FIG. 3 (displaying the paver-generated location and temperature of the threshold thermal characteristic on the display 24 of the paving machine), reference is made to FIG. 5 showing display 24 of paving machine 10 providing a verification page/screen 500 identifying the thermal objects 50 (as portions A and B of the field of view 42 of thermal camera 32), along with temperature listings 502 of the thermal objects 50, and location listing 504 of the thermal objects. As shown in FIG. 5, the temperature listings 502 may be provided in Celsius and Fahrenheit, and the location listing 504 may be provided in geographic Cartesian coordinates. It is understood that other conventions may be additionally or alternatively provided on page/screen 500 of display 24, and that the arrangement of the information by be varied. As shown in FIG. 5, page/screen 500 only displays the temperature and location information for the thermal objects 50 (the threshold thermal characteristic of the thermal data), and thus no other temperatures or location information is displayed on the page. Further, while page/screen 500 is described as being generated on display 24, it is understood that page/screen could be generated elsewhere, such as to a display remove from paving machine 10.

Regarding step 306 of FIG. 3 (determining a location and temperature of a threshold thermal characteristic of the asphalt mat by one or more external systems), the temperature and location of thermal objects can be determined or measured by systems or instruments other than the thermal recognition system 30 and the position determining system 34 of paving machine 10. Such systems or instruments are identified herein as "external" systems or instruments. For example, as shown in FIG. 4, the temperature of the thermal objects 50 can be determined by an external thermal sensor, such as a hand-held infrared measuring device 52 external of the paving machine 10, and the location of the thermal objects 50 can be determined by an external locating device such as a GPS survey rover 54 external to the paving machine 10. It is understood that other external measuring instruments or systems may be used to determine the temperature and location of the thermal objects.

Regarding step 308 of FIG. 3 (comparing the externally-determined location and temperature to the paver-generated location and temperature), the temperature value and location of the thermal object(s) 50 provided by the paving machine 10 on screen/page 500 can be compared to the temperature value and location determined based on the external measuring devices and systems 52, 54. This comparison can verify the accuracy of the temperature and location values generated by the paving machine, and thus provide a better assurance that the thermal profile of asphalt mat 44 is accurate. Further, if the measurements from external measuring devices 52, 54 indicate a meaningful deviation from the temperature or location value of screen/page 500, then the operator can take corrective action, such as recalibrating the system. It is understood that this comparison/verification can be done manually by merely comparing the temperature and location values, or alternatively, the externally-determined location and temperature values can be input into paving machine 10 to calculate and/or log the differences from the paver-generated location and temperature values.

INDUSTRIAL APPLICABILITY

The method and system of the present disclosure may be used in any paving machine 10 having a thermal recognition system 30. Further, the methods and systems described herein have applicability in facilitating the forming of high quality asphalt mats 44.

As discussed above, generating thermal profiles of asphalt mats is becoming more commonplace as a way of measuring and assuring the quality of a newly formed asphalt mat. However, such thermal profiles may be subject to inaccuracies. The present disclosure provides a straightforward, reliable, and quick method and system for verifying the accuracy of the thermal profile generated by the paving machine. In particular, the present disclosure provides a single display screen/page 500 that readily identifies the temperature and location of designated thermal objects, and thus facilitates a verification of the generated information by external systems. Further, the method and system can provide a simple and straightforward way to determine if the thermal profile provided by the paving machine needs maintenance or recalibration.

While principles of the present disclosure are described herein with reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, the invention is not to be considered as limited by the foregoing description.

What is claimed is:

1. A paving machine, comprising:
    a thermal recognition system of the paving machine that creates thermal data of an area behind the paving machine, wherein the thermal recognition system is configured to create the thermal data of the area behind the paving machine while the paving machine is not performing a paving operation;
    a position determining system that identifies a location of the thermal data in location coordinates;
    a display that displays the location and temperature of a threshold thermal characteristic of the thermal data, and
    a controller that receives the thermal data and location data and determines the location and temperature of the threshold thermal characteristic, wherein the controller is configured to identify one or more thermal objects that include the threshold thermal characteristic compared to a surrounding environment located behind the paving machine,
    wherein the location and temperature of the threshold thermal characteristic of the one or more thermal objects is displayed when the paving machine is not performing the paving operation, and
    wherein the controller is further configured to:
        receive location and temperature values of the thermal object determined by one or more external systems; and
        compare the location and temperature values determined by the one or more external systems to the location and temperature values generated by the thermal recognition system of the paving machine.

2. The paving machine of claim 1, wherein the threshold thermal characteristic of the one or more thermal objects is a maximum temperature characteristic of the thermal data that is hotter than the surrounding environment.

3. The paving machine of claim 1, wherein the thermal recognition system is a thermal imaging camera, and the thermal data is thermal image data.

4. The paving machine of claim 3, wherein the area behind the paving machine corresponds to a viewing area of the thermal imaging camera.

5. The paving machine of claim 1, wherein the threshold thermal characteristic includes a plurality of locations of the thermal data.

6. The paving machine of claim 1, wherein the position determining system includes a GPS system.

7. The paving machine of claim 1, wherein the location and temperature of the threshold thermal characteristic is displayed on a same page of the display, and no other temperatures or location information is displayed on the same page.

8. The paving machine of claim 1, wherein the location and temperature of the threshold thermal characteristic is displayed in real time.

9. A method of verifying asphalt mat temperature values and location data generated by a paving machine, comprising:
    identifying a location and temperature values of a threshold or identifiable thermal characteristic of thermal data generated by the paving machine with a thermal recognition system, wherein the threshold or identifiable thermal characteristic corresponds to one or more thermal objects that include the threshold thermal or identifiable characteristic compared to a surrounding environment located behind the paving machine, wherein the thermal recognition system creates the thermal data of the surrounding environment located behind the paving machine while the paving machine is not performing a paving operation;
    displaying the location and temperature values of the threshold or identifiable thermal characteristic generated by the paving machine on a display of the paving machine, wherein the location and temperature of the threshold or identifiable thermal characteristic of the one or more thermal objects is displayed when the paving machine is not performing the paving operation;
    determining location and temperature values of the threshold or identifiable thermal characteristic by one or more external systems;
    identifying the location of the one or more thermal objects based on the determined location and temperature values of the threshold or identifiable thermal characteristic by the one or more external systems; and comparing the determined location and temperature values of the threshold or identifiable thermal characteristic by the one or more external systems to the location and temperature values of the threshold or identifiable thermal characteristic generated by the paving machine.

10. The method of claim 9, wherein the threshold or identifiable temperature characteristic corresponds to one thermal object located behind the paving machine.

11. The method of claim 9, wherein the threshold or identifiable thermal characteristic includes a plurality of thermal objects located behind the paving machine.

12. The method of claim 9, wherein the one or more external systems includes an external locating device and an external thermal sensor.

13. The method of claim 9, wherein the thermal recognition system is a thermal imaging camera, the thermal data is thermal image data; and the location generated by the paving machine is based on a GPS system of the paving machine.

14. The method of claim 9, wherein the location and temperature values generated by the paving machine are displayed on a same page of the display, and no other temperatures or location information is displayed on the same page.

15. The method of claim 9, wherein the location and temperature of the threshold or identifiable thermal characteristic is displayed in real time.

16. A method of verifying asphalt mat temperature values and location data generated by a paving machine, comprising:

identifying location and temperature values of a thermal object that include a threshold or identifiable thermal characteristic compared to a surrounding environment using a thermal recognition system of the paving machine and a position determining system of the paving machine, wherein the thermal recognition system creates thermal data of the surrounding environment while the paving machine is not performing a paving operation;

displaying the location and temperature values of the thermal object generated by the paving machine on a display of the paving machine, wherein the location and temperature of the threshold thermal characteristic of the thermal object is displayed when the paving machine is not performing the paving operation;

determining location and temperature values of the thermal object by one or more external systems; and comparing the location and temperature values determined by the one or more external systems to the location and temperature values generated by the paving machine.

17. The method of claim 16, wherein the displaying of the location and temperature values generated by the paving machine are displayed on a same page of the display, and no other temperatures or location information is displayed on the same page.

* * * * *